US008144359B2

(12) United States Patent
Sawayanagi et al.

(10) Patent No.: US 8,144,359 B2
(45) Date of Patent: Mar. 27, 2012

(54) SYSTEM FOR HANDLING IMAGE DATA, IMAGE PROCESSING SYSTEM, IMAGE PROCESSING APPARATUS, METHOD FOR PROVIDING IMAGE DATA, AND COMPUTER-READABLE STORAGE MEDIUM FOR COMPUTER PROGRAM

(75) Inventors: Kazumi Sawayanagi, Itami (JP); Toshihiko Otake, Ikeda (JP); Hideyuki Matsuda, Hirakata (JP); Masao Hosono, Toyokawa (JP); Manabu Furukawa, Nagaokakyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 9 days.

(21) Appl. No.: 12/888,120

(22) Filed: Sep. 22, 2010

(65) Prior Publication Data

US 2011/0069353 A1    Mar. 24, 2011

(30) Foreign Application Priority Data

Sep. 24, 2009   (JP) ................. 2009-218549

(51) Int. Cl.
*H04N 1/32* (2006.01)
*H04N 1/40* (2006.01)
*G06K 15/00* (2006.01)
(52) U.S. Cl. .................. 358/1.16; 358/448; 358/443
(58) Field of Classification Search .................. 358/443, 358/448, 1.15, 1.16, 444, 468
See application file for complete search history.

(56) References Cited

U.S. PATENT DOCUMENTS

| 2007/0147794 | A1* | 6/2007 | Araki ........................... 386/125 |
| 2008/0151299 | A1 | 6/2008 | Takahata |
| 2008/0309961 | A1 | 12/2008 | Aichi et al. |
| 2010/0082699 | A1* | 4/2010 | Miyasa et al. ............... 707/802 |

FOREIGN PATENT DOCUMENTS

| JP | 2000-081959 | 3/2000 |
| JP | 2006-067368 | 3/2006 |
| JP | 2006-088340 | 4/2006 |
| JP | 2008-178066 | 7/2008 |

OTHER PUBLICATIONS

Decision to Grant a Patent dated Aug. 16, 2011 for corresponding Japanese patent application No. 2009-218549 and its English translation; 8 pages.

* cited by examiner

*Primary Examiner* — Jerome Grant, II
(74) *Attorney, Agent, or Firm* — Morrison & Foerster LLP

(57) ABSTRACT

An image processing system performs a specific process on first image data to generate second image data, and estimates, if it is specified that the second image data is to be stored into a portable storage medium, a necessary time for the second image data to be generated. If the necessary time is longer than a predetermined period of time, depending on a selection made by a user, the image processing system stores the second image data into the portable storage medium after the second image data is completely generated, or, alternatively, stores, identification information including a storage location of the second image data into the portable storage medium, and then, stores the second image data into an image data storage portion. The image processing system, then, transmits, to a terminal, the second image data stored in the image data storage portion in accordance with a request from the terminal.

14 Claims, 19 Drawing Sheets

FIG. 11A

JOB ID: J00001
FORMAT: WORD PROCESSOR FORMAT
DELIVERY DESTINATION DEVICE: USB FLASH MEMORY
DELIVERY DESTINATION FOLDER: ¥USB¥GAZOU
TEMPORARY SAVE FOLDER: ¥temp¥J00001

JOB ID: J00001
FORMAT: WORD PROCESSOR FORMAT
DELIVERY DESTINATION DEVICE: SERVER
DELIVERY DESTINATION FOLDER: ¥USB¥GAZOU
TEMPORARY SAVE FOLDER: server/db/J00001

70

SYSTEM FOR HANDLING IMAGE DATA, IMAGE PROCESSING SYSTEM, IMAGE PROCESSING APPARATUS, METHOD FOR PROVIDING IMAGE DATA, AND COMPUTER-READABLE STORAGE MEDIUM FOR COMPUTER PROGRAM

This application is based on Japanese patent application No. 2009-218549 filed on Sep. 24, 2009, the contents of which are hereby incorporated by reference.

BACKGROUND OF THE INVENTION

1. Field of the Invention

The present invention relates to an image processing apparatus having a function to write image data into a portable storage medium, and the like.

2. Description of the Related Art

Image processing apparatuses having a variety of functions, such as copying, PC printing, scanning, faxing, and file server, have recently come into widespread use. Such image processing apparatuses are sometimes called "multifunction devices", "Multi-Function Peripherals (MFPs)", or the like.

Further, the functionalities of image processing apparatuses are increasingly improved. Software products for image processing are also diversified. There is also proposed an image processing apparatus for performing image processing in cooperation with a server.

An image processing apparatus has been provided with a Universal Serial Bus (USB) serving as an interface to connect the image processing apparatus to another device.

In recent years, a portable storage medium such as a USB flash memory or a portable hard disk has become inexpensive. This enables a user to readily use such a portable storage medium also in an image processing apparatus.

An apparatus is proposed in Japanese Laid-open Patent Publication No. 2008-178066. The apparatus is configured to save, to a removable memory, image data obtained by scanning a document image with a scanner with the amount of usage of the removable memory suppressed. The apparatus saves, to the removable memory, not the image data but positional information of the image data saved in a server.

The method disclosed in Japanese Laid-open Patent Publication No. 2008-178066 makes it possible to reduce the quantity of data stored in a portable storage medium. The method, however, involves accessing a server to download data every time the data is necessary. In view of this, as long as the storage capacity allows, it is more convenient to store data itself than to store a storage location of the data in the server. As mentioned above, the storage capacity of recent portable storage media has been increased. While network environment is being enhanced, it is desired to read out data directly from a portable storage medium as far as possible.

SUMMARY

The present disclosure is directed to solve the problems pointed out above, and therefore, an object of an embodiment of the present invention is to use a portable storage medium such as a USB flash memory in an image processing apparatus such as an MFP more convenient as compared with conventional technologies.

According to an aspect of the present invention, a system for handling image data includes an image processing system that performs a specific process on image data, and a terminal. The image processing system includes a specific process portion that performs a specific process on first image data to generate second image data, an estimating portion that, if it is specified that the second image data is to be stored into a portable storage medium, estimates a necessary time that is a time required for the second image data to be generated, a selection portion for a user to determine whether or not to store, instead of the second image data, identification information for obtaining the second image data into the portable storage medium, if the necessary time thus estimated is longer than a predetermined period of time, an image data storage control portion that, if the user determines not to store the identification information into the portable storage medium, stores the second image data into the portable storage medium after the second image data is completely generated, and an identification information storage control portion that, if the user determines to store the identification information into the portable storage medium, stores, as the identification information, information including a storage location of the second image data into the portable storage medium, and stores the second image data into an image data storage portion after the second image data is completely generated. The terminal includes a reading portion that reads out the identification information from the portable storage medium, and a request portion that makes a request to the image processing system, via a communication line, for the second image data based on the identification information thus read out. The image processing system further includes a transmission portion that transmits, to the terminal, the second image data stored in the image data storage portion in accordance with the request from the terminal.

These and other characteristics and objects of the present invention will become more apparent by the following descriptions of preferred embodiments with reference to drawings.

BRIEF DESCRIPTION OF THE DRAWINGS

FIGS. 11A and 11B are diagrams illustrating an example of job setting information.

DESCRIPTION OF THE PREFERRED EMBODIMENTS

Figure 1:
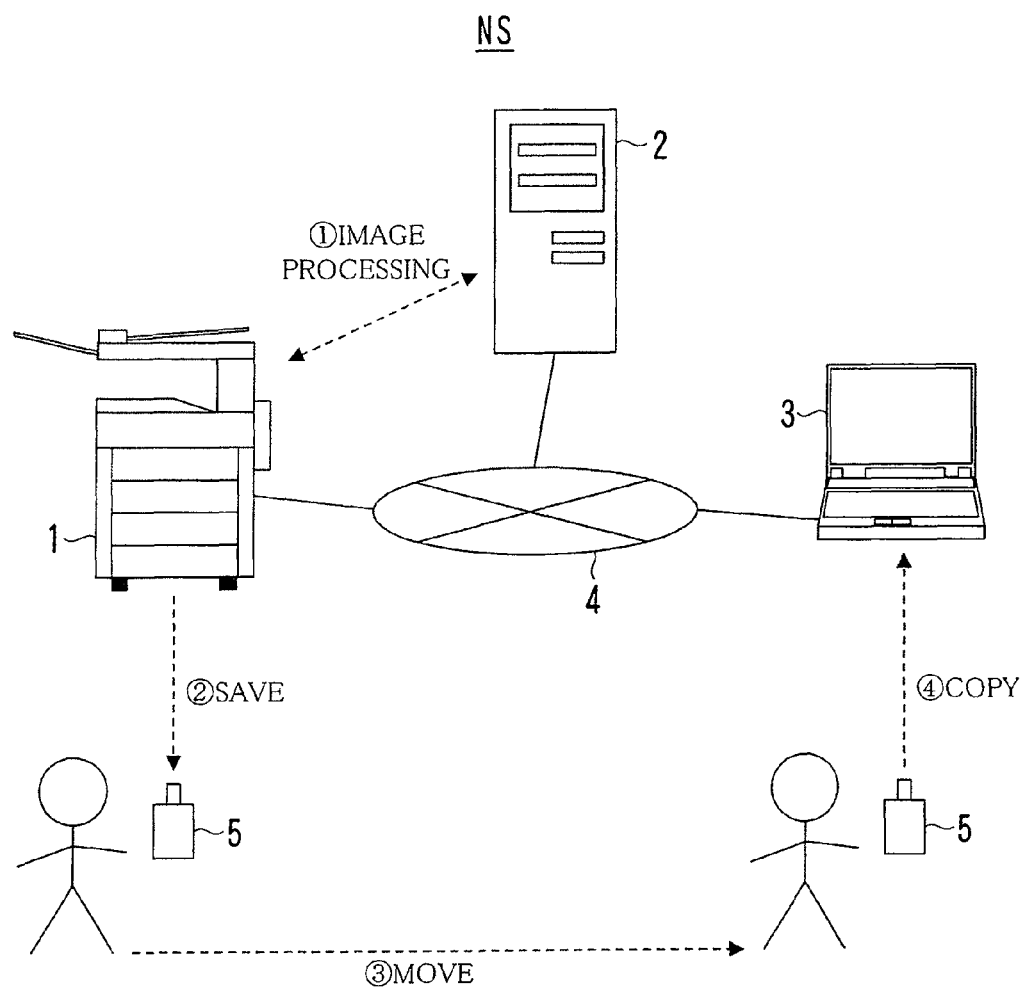
FIG. 1 is a diagram illustrating an example of the overall configuration of a network system.
Figure 2:
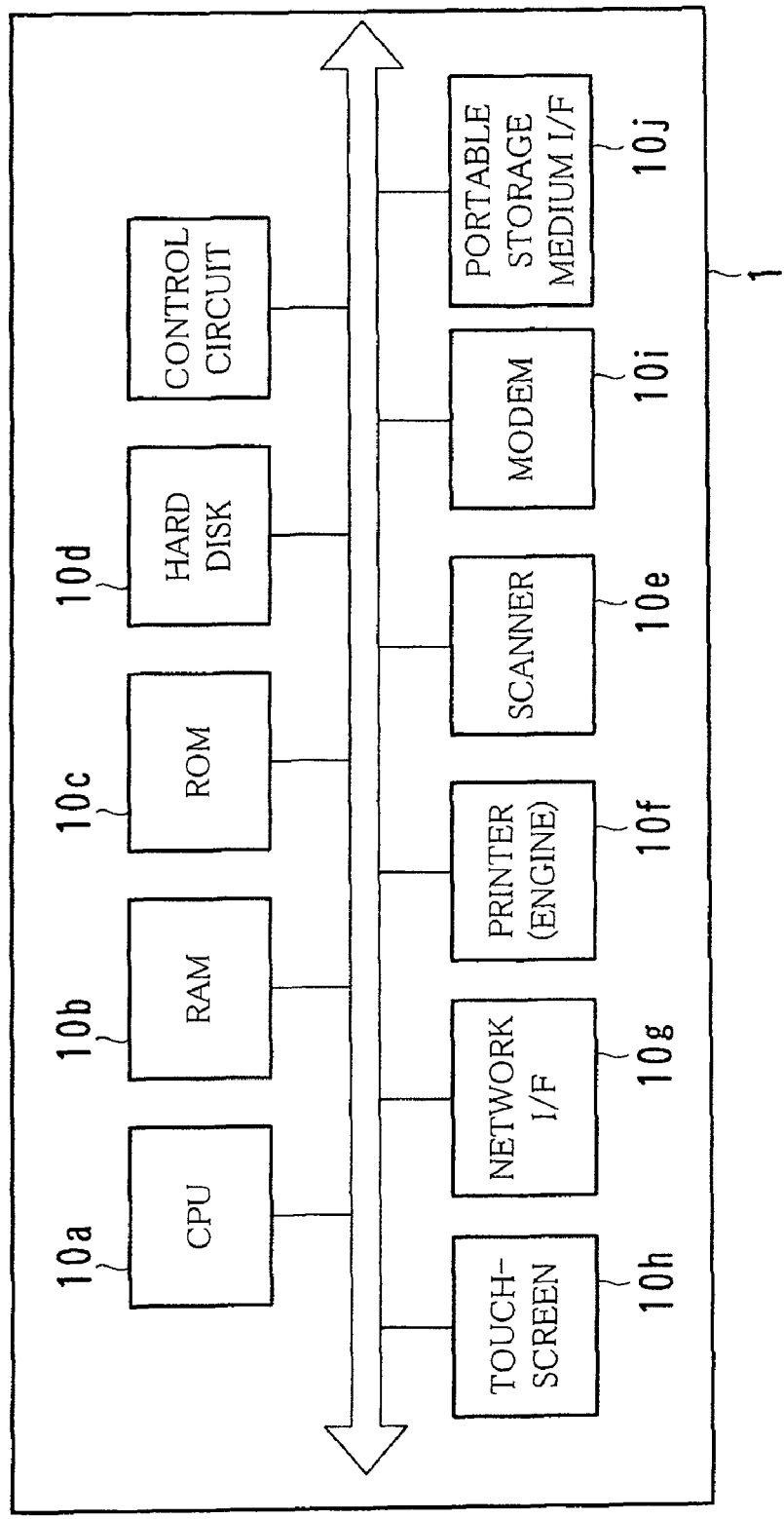
FIG. 2 is a diagram illustrating an example of the hardware configuration of an image forming apparatus.
Figure 3:
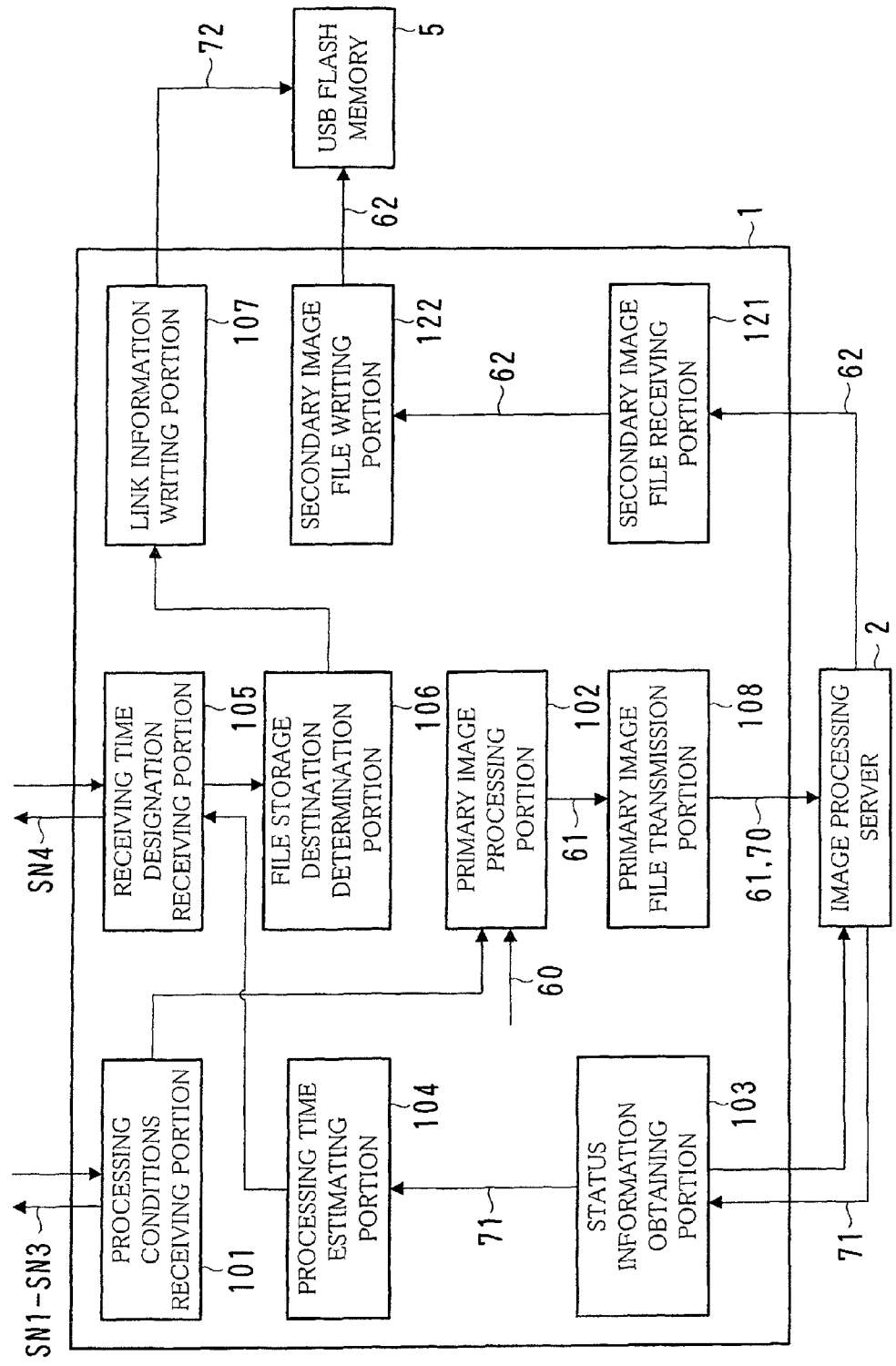
FIG. 3 is a diagram illustrating an example of the functional configuration of an image forming apparatus.
Figure 4:
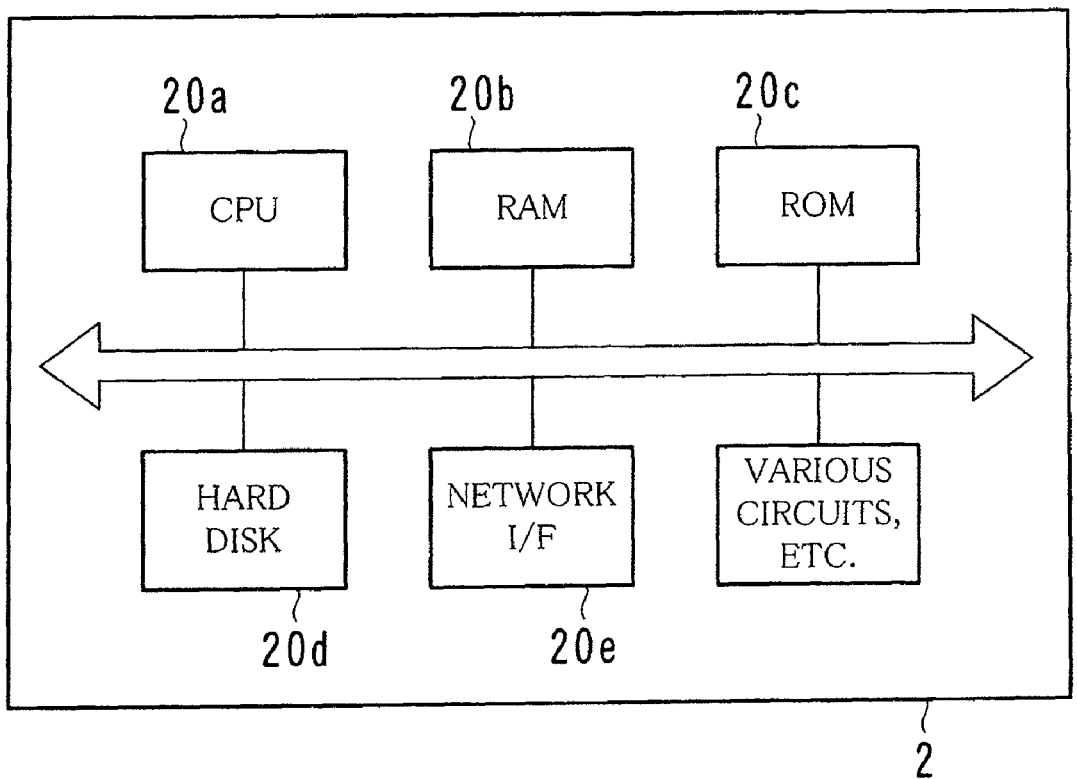
FIG. 4 is a diagram illustrating an example of the hardware configuration of an image processing server.
Figure 5:
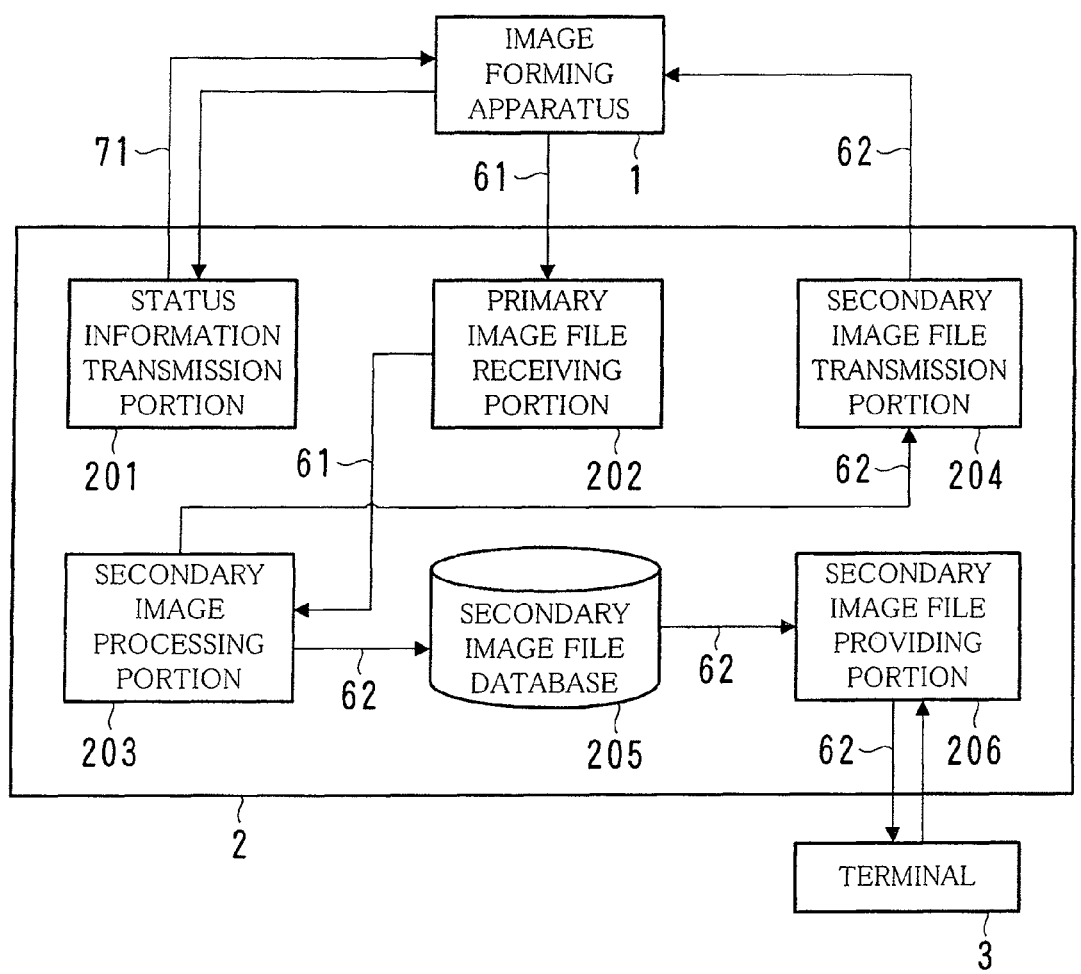
FIG. 5 is a diagram illustrating an example of the functional configuration of an image processing server.
Figure 6:
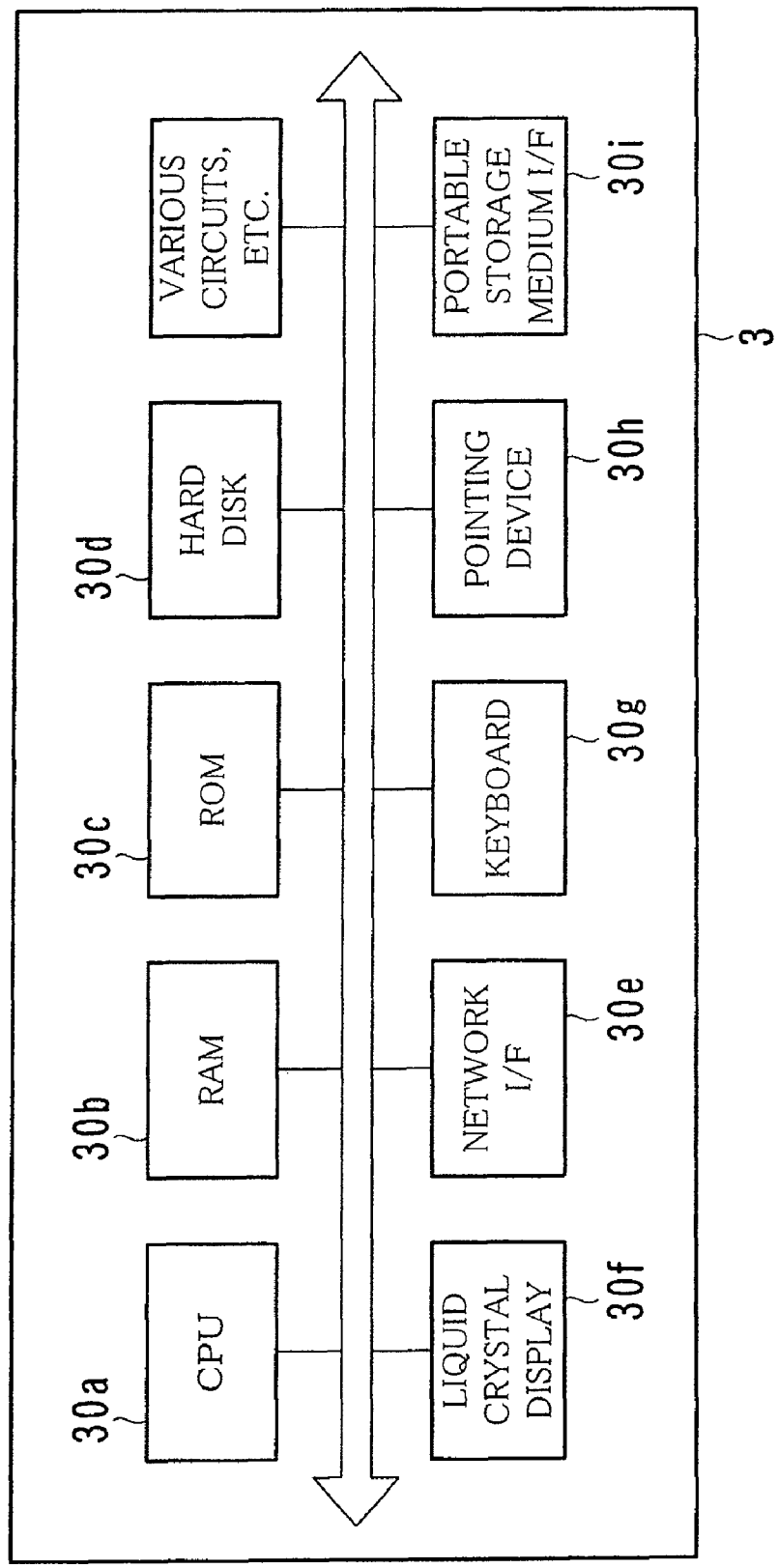
FIG. 6 is a diagram illustrating an example of the hardware configuration of a terminal.
Figure 7:
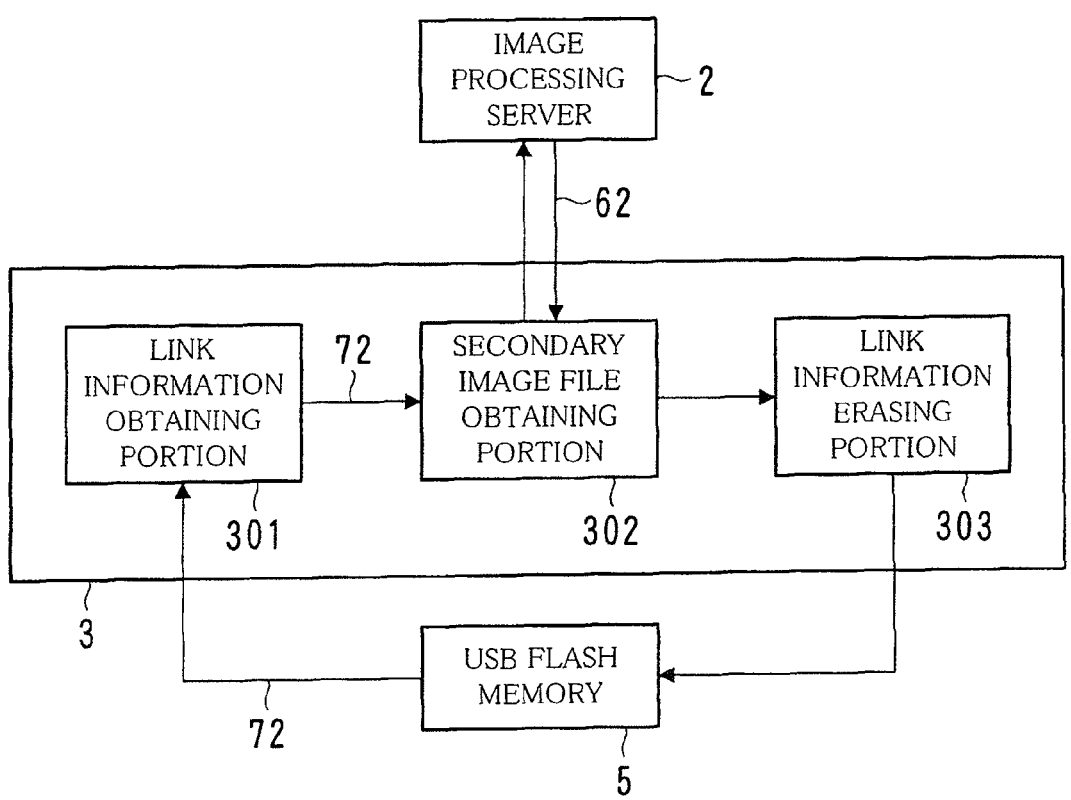
FIG. 7 is a diagram illustrating an example of the functional configuration of a terminal.

FIG. 1 is a diagram illustrating an example of the overall configuration of a network system NS; FIG. 2 is a diagram illustrating an example of the hardware configuration of an image forming apparatus 1; FIG. 3 is a diagram illustrating an example of the functional configuration of the image forming apparatus 1; FIG. 4 is a diagram illustrating an example of the hardware configuration of an image processing server 2; FIG. 5 is a diagram illustrating an example of the functional configuration of the image processing server 2; FIG. 6 is a diagram illustrating an example of the hardware configuration of a terminal 3; and FIG. 7 is a diagram illustrating an example of the functional configuration of the terminal 3.

Referring to FIG. 1, the network system NS is configured of the image forming apparatus 1, the image processing server 2, the terminal 3, a communication line 4, and so on. These devices are connectable to one another via the communication line 4. Examples of the communication line 4 are a public line, a dedicated line, the Internet, and a so-called Local Area Network (LAN).

The network system NS is installed in organizations such as business offices or public offices, and is used by members belonging to such an organization. The following is a description of an example in which the network system NS is used in an X-company. An employee of the X-company is hereinafter referred to as a "user".

The image forming apparatus 1 is an image processing apparatus generally called a multifunction device or a Multi Function Peripheral (MFP). The image forming apparatus 1 is a device that integrates a variety of functions, such as copying, PC printing (network printing), faxing, scanning, box function, electronic mail communication function, and so on, into a single unit.

The "PC printing function" is a function to print an image onto paper based on image data received from the terminal 3.

The "box function" is a function in which storage areas called "boxes" or "personal boxes" are allocated on a user-by-user basis, and data such as image data is saved to a user's own storage area and managed therein. The boxes herein correspond to "folders" or "directories" in a personal computer. In this embodiment, data is saved in a box on a file-by-file basis.

The image processing server 2 performs various types of image processing such as image data format conversion, image correction, file compression, and image resolution modification. In particular, the image processing server 2 has a function to convert a Portable Document Format (PDF) file into a Compact PDF file, a Joint Photographic Experts Group (JPEG) file, or a word processor file which is described later. The image processing server 2 performs a process for such conversion into these files instead of the image forming apparatus 1.

The image processing server 2 also serves as a File Transfer Protocol (FTP) server. To be specific, the image processing server 2 receives a file from the image forming apparatus 1 via FTP, or transfer a file to the terminal 3 via FTP. The image processing server 2 is also capable of transferring a file to the terminal 3 over a Server Message Block (SMB).

A driver for causing the image forming apparatus 1 to perform a process for printing an image or the like is installed on the terminal 3. A personal computer, a Personal Digital Assistant (PDA), or the like is used as the terminal 3.

The image forming apparatus 1 and the terminal 3 are installed in a building of the X-company. The following is a description of an example in which the image forming apparatus 1 is installed in a space shared by a plurality of employees (users) and the terminal 3 is placed at each user's desk.

A user causes the image forming apparatus 1 to scan an image depicted on paper to create an electronic file of the image. The user, then, stores the electronic file, which may be hereinafter referred to as a "file" simply, into a portable storage medium, and copies the electronic file into the terminal 3 of the user. When creating the electronic file of the image, the image forming apparatus 1 can cause the image processing server 2 to perform image processing as necessary.

For example, the user goes to the site of the image forming apparatus 1 with paper, places the paper on the image forming apparatus 1, and connects a portable storage medium thereto. The user, then, enters a command to scan an image depicted on the paper. In response to the command, the image forming apparatus 1 scans the image depicted on paper, performs image processing in cooperation with the image processing server 2 if necessary, and creates an image file (the encircled number 1 of FIG. 1). The image forming apparatus 1 saves the created image file to the portable storage medium (the encircled number 2).

The user takes away the paper from the image forming apparatus 1, removes the portable storage medium therefrom, and moves to his/her desk (the encircled number 3). The user, then, connects the portable storage medium to his/her terminal 3, and copies the image file saved in the portable storage medium into the terminal 3 (the encircled number 4).

The image forming apparatus 1 and the image processing server 2 are configured to perform image processing in cooperation with each other. Thus, both the image forming apparatus 1 and the image processing server 2 constitute an image processing system.

In the meantime, if it takes time for the image processing server 2 to perform image processing, a user cannot go back to his/her desk from the site of the image forming apparatus 1. This is because the user cannot remove the portable storage medium from the image forming apparatus 1 until the image processing is completed and the image file is completely saved to the portable storage medium.

To cope with this, the network system NS according to this embodiment is so configured that a user can obtain an image file even if the user removes a portable storage medium from the image forming apparatus 1 before image processing is completed. A description as to how to realize such a configuration is given below.

Referring to FIG. 2, the image forming apparatus 1 is configured of a Central Processing Unit (CPU) 10a, a Random Access Memory (RAM) 10b, a Read Only Memory (ROM) 10c, a hard disk 10d, a scanner 10e, a printer 10f, a network interface 10g, a touchscreen 10h, a modem 10i, a portable storage medium interface 10j, a control circuit, and so on.

The scanner 10e is a device that reads images printed on paper, such as photographs, characters, drawings, diagrams, and the like, and creates image data thereof.

The printer 10f serves to print, onto paper, an image obtained by scanning with the scanner 10e or an image included in image data received from another device.

The touchscreen 10h displays, for example, a screen for giving a message to a user, a screen for displaying the result of a process, and a screen for the user to enter a command to be given to the image forming apparatus 1. The touchscreen 10h also detects a position thereof touched (pressed) by the user and informs the CPU 10a of the touched position.

The network interface 10g is a Network Interface Card (NIC) for communicating with the image processing server 2 and the terminal 3 according to Transmission Control Protocol/Internet Protocol (TCP/IP) via the communication line 4.

The modem 10i is a device to perform communication with another facsimile terminal via a fixed-line telephone network based on a protocol such as Group 3 (G3).

Referring to FIG. 3, the ROM 10c or the hard disk 10d stores programs for implementing functions of a processing conditions receiving portion 101, a primary image processing portion 102, a status information obtaining portion 103, a processing time estimating portion 104, a receiving time designation receiving portion 105, a file storage destination determination portion 106, a link information writing portion 107, a primary image file transmission portion 108, a secondary image file receiving portion 121, a secondary image file writing portion 122, and the like. These programs are loaded into the RAM 10b as necessary, whereupon the programs are executed by the CPU 10a.

The portable storage medium interface 10j is an interface to connect a portable storage medium to the image forming apparatus 1. The following description takes an example in which a Universal Serial Bus (USB) flash memory is used as the portable storage medium. Accordingly, a USB interface board is used as the portable storage medium interface 10j.

Referring to FIG. 4, the image processing server 2 is configured of a CPU 20a, a RAM 20b, a ROM 20c, a hard disk 20d, a network interface 20e, a control circuit, and so on.

The network interface 20g is a NIC for communicating with the image forming apparatus 1, the terminal 3, and the like according to TCP/IP via the communication line 4.

Referring to FIG. 5, the ROM 20c or the hard disk 20d stores programs for implementing functions of a status information transmission portion 201, a primary image file receiving portion 202, a secondary image processing portion 203, a secondary image file transmission portion 204, a secondary image file database 205, a secondary image file providing portion 206, and the like. These programs are loaded into the RAM 20b as necessary, whereupon the programs are executed by the CPU 20a.

Referring to FIG. 6, the terminal 3 is configured of a CPU 30a, a RAM 30b, a ROM 30c, a hard disk 30d, a network interface 30e, a liquid crystal display 30f, a keyboard 30g, a pointing device 30h, a portable storage medium interface 30i, a control circuit, and so on.

The network interface 30e is a NIC for communicating with the image forming apparatus 1, the image processing server 2, and the like according to TCP/IP via the communication line 4.

The liquid crystal display 30f displays, thereon, a screen to give a message to a user, a screen for indicating a processing result, a screen for the user to enter a command given to the terminal 3, and so on.

The keyboard 30g and the pointing device 30h are used for a user to enter information and commands to the terminal 3.

The portable storage medium interface 30i is an interface to connect a portable storage medium to the terminal 3. As with the portable storage medium interface 10j of the image forming apparatus 1, this embodiment describes an example in which the portable storage medium interface 30i is a USB interface board.

Referring to FIG. 7, the ROM 30c or the hard disk 30d stores programs for implementing functions of a link information obtaining portion 301, a secondary image file obtaining portion 302, a link information erasing portion 303, and the like. These programs are loaded into the RAM 30b as necessary, whereupon the programs are executed by the CPU 30a.

The whole or a part of the functions of the individual portions illustrated in FIGS. 3, 5, and 7 may be implemented merely by hardware such as a circuit.

Figure 8:
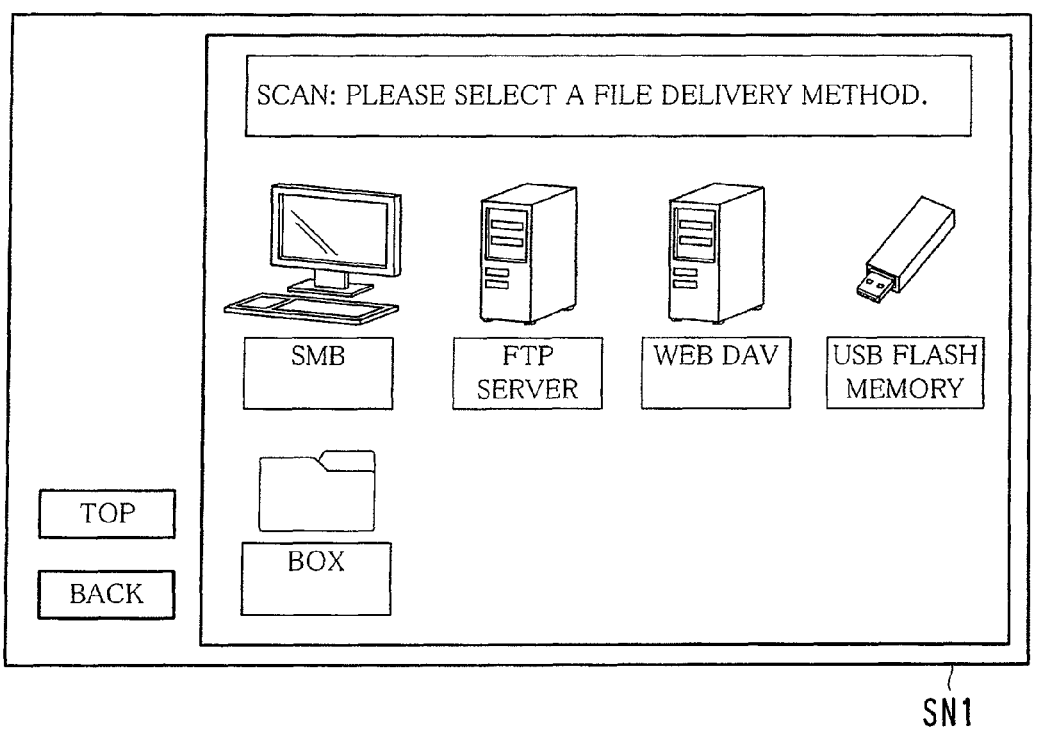
FIG. 8 is a diagram illustrating an example of a delivery destination selection screen.
Figure 9:
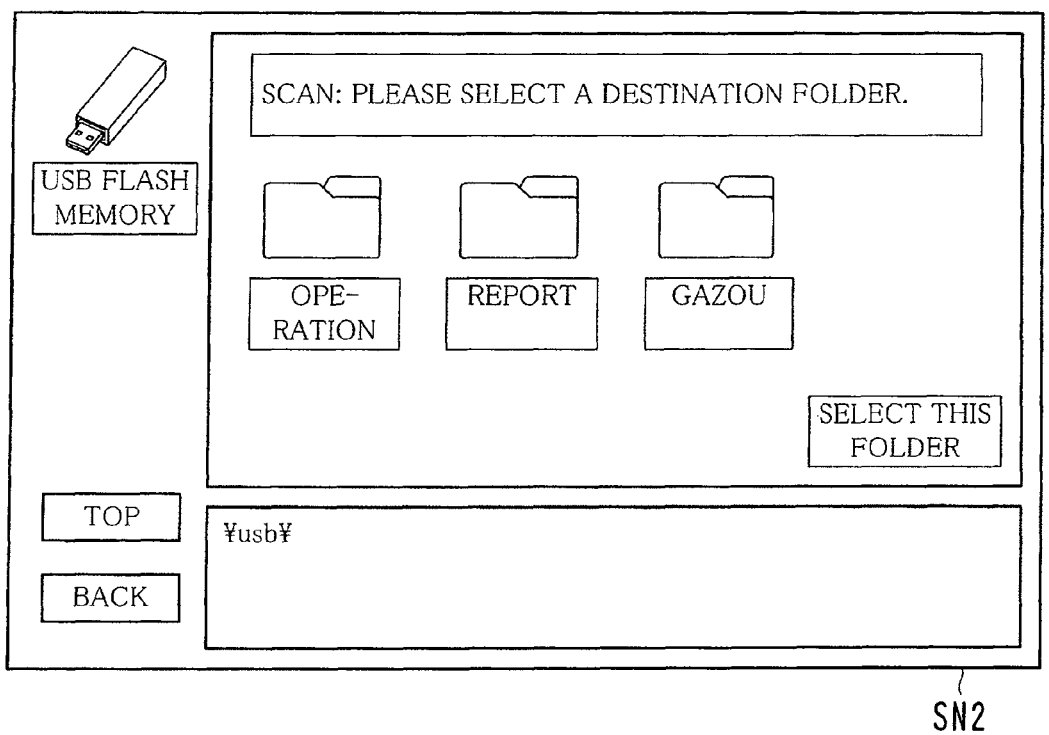
FIG. 9 is a diagram illustrating an example of a destination folder selection screen.
Figure 10:
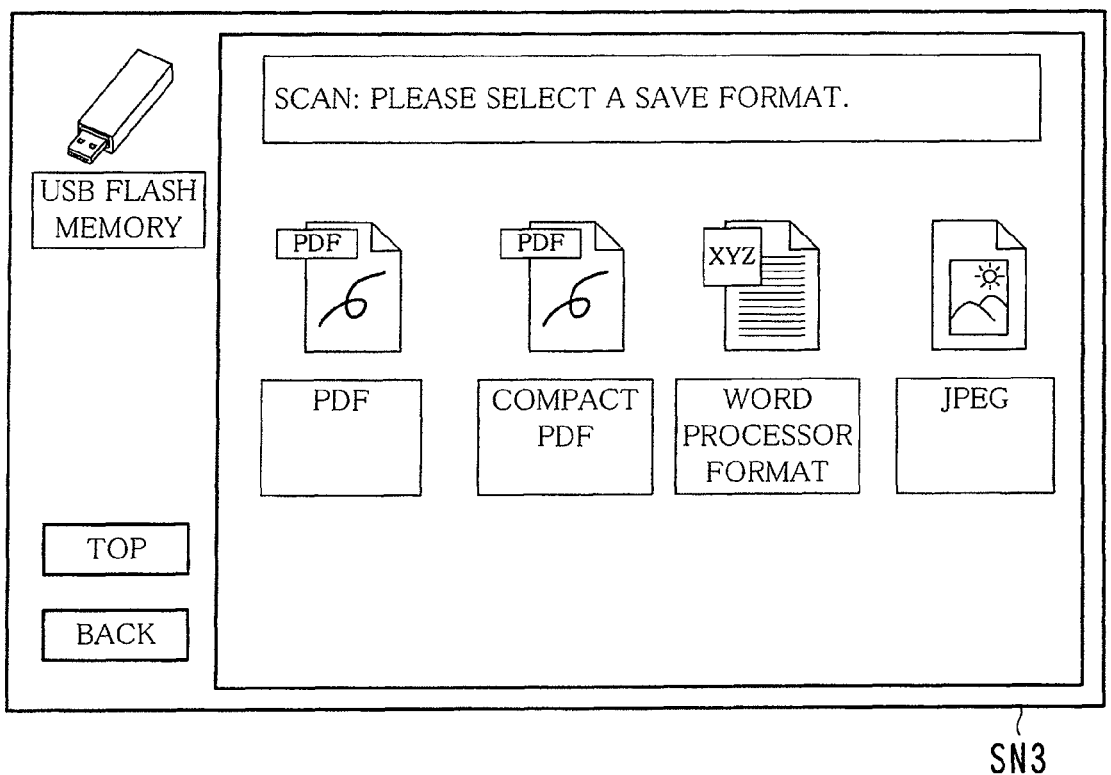
FIG. 10 is a diagram illustrating an example of a save format selection screen.
Figure 12:
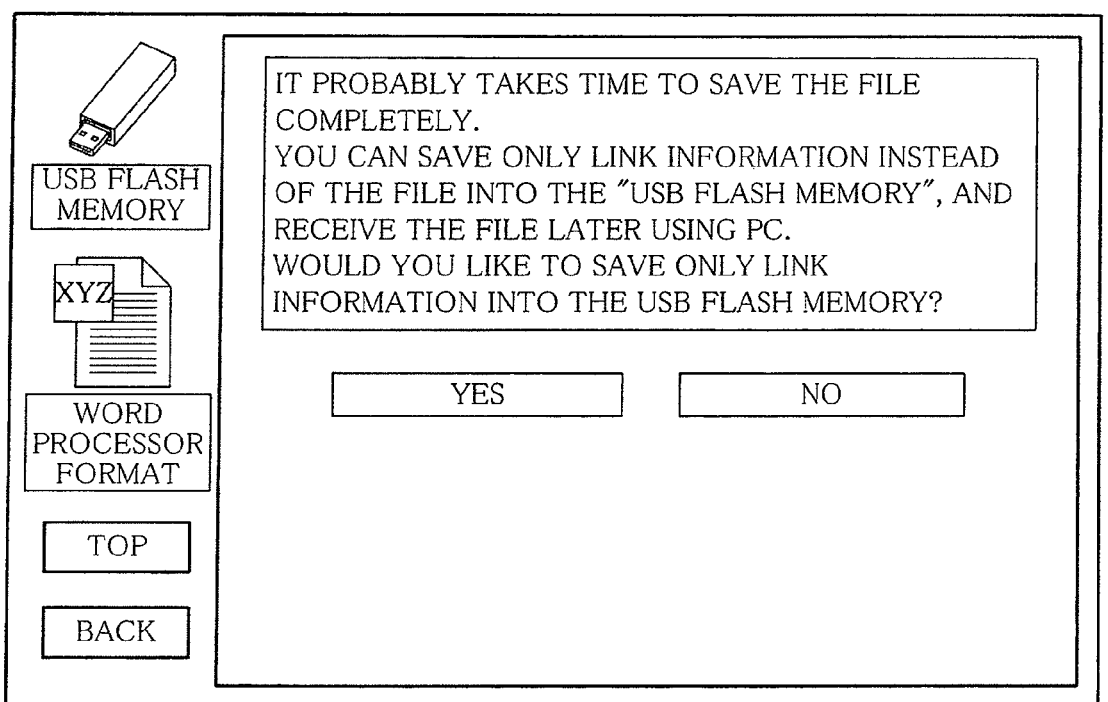
FIG. 12 is a diagram illustrating an example of a receiving time designation screen.

FIG. 8 is a diagram illustrating an example of a delivery destination selection screen SN1; FIG. 9 is a diagram illustrating an example of a destination folder selection screen SN2; FIG. 10 is a diagram illustrating an example of a save format selection screen SN3; FIGS. 11A and 11B are diagrams illustrating an example of job setting information 70; and FIG. 12 is a diagram illustrating an example of a receiving time designation screen SN4.

The following is a description of roles of the individual portions of the image forming apparatus, the image processing server 2, and the terminal 3 shown in FIGS. 3, 5, and 7 respectively in the case of executing a job in which an image depicted on paper is scanned to make a file and the file is saved to a USB flash memory, i.e., a so-called Scan_To_USB job.

Referring to FIG. 3, the processing conditions receiving portion 101 of the image forming apparatus 1 performs a process for receiving conditions for a Scan_To_USB job and a command to execute the Scan_To_USB job, in the following manner.

A user goes to the installation site of the image forming apparatus 1 with paper carrying an image for which a file (electronic data) is to be created, and a USB flash memory 5 to save the file. The user, then, places the paper onto the scanner 10e, connects the USB flash memory 5 to the portable storage medium interface 10j, and enters a predetermined command onto the touchscreen 10h.

Responding to this operation, the processing conditions receiving portion 101 displays the delivery destination selection screen SN1 as shown in FIG. 8 on the touchscreen 10h. The user selects, on the delivery destination selection screen SN1, a device to which a file resulting from conversion of an image, i.e., an image file, is to be saved. Such a device is hereinafter referred to as a delivery destination device. In this example, the image file is to be saved to the USB flash memory 5; therefore the user presses a "USB flash memory" button to select the same.

When the USB flash memory is specified as the delivery destination, the processing conditions receiving portion 101 displays the destination folder selection screen SN2 shown in FIG. 9. A list of folders (directories) provided in the USB flash memory 5 is displayed on the destination folder selection screen SN2. The user selects, on the destination folder selection screen SN2, a folder to which the image file is to be saved, i.e., a delivery destination folder, among the folders by pressing a button corresponding to his/her desired folder.

Responding to this operation, the processing conditions receiving portion 101 displays the save format selection screen SN3 as shown in FIG. 10. The user selects, on the save format selection screen SN3, a desired format for the image file by pressing a button corresponding to the desired format. After that, the user presses a start button or the like to issue a command to execute a Scan_To_USB job.

Responding to this command, the processing conditions receiving portion 101 receives, as conditions for the Scan_To_USB job, the delivery destination device, the delivery destination folder, and the format that are selected (specified) respectively on the delivery destination selection screen SN1, the destination folder selection screen SN2, and the save format selection screen SN3, and also receives the command to execute a Scan_To_USB job.

The processing conditions receiving portion 101, further, issues a unique job identification (ID) to the Scan_To_USB job. The processing conditions receiving portion 101, then, generates job setting information 70 as shown in FIG. 11A. The job setting information 70 includes the job ID, details of the individual conditions received, and a temporary save folder. The "temporary save folder" is a folder to which an image file is temporarily saved until the image file is saved to a delivery destination device. A default of the temporary save folder is a folder exclusively for the Scan_To_USB job. Such a folder is provided in a predetermined folder of the image forming apparatus 1. In the case, for example, where the job ID of the Scan_To_USB job is "J00001", the name of the predetermined folder is "temp", and the job ID is given as the name of the exclusive folder, a folder named "¥temp¥J00001" is regarded as the temporary save folder.

When the conditions for the Scan_To_USB job and the command to execute the Scan_To_USB job are received, the image forming apparatus 1 performs processing steps of the Scan_To_USB job in due order. Some of the processing steps are executed by the image processing server 2 appropriately.

As the initial step of the Scan_To_USB job, the scanner 10e scans an image depicted on the paper placed thereon to create image data 60. The image data 60 is raw data, or, in other words, bitmap data of Red (R), Green (G), and Blue (B).

The primary image processing portion 102 converts the image data 60 generated by the scanner 10e into a file in a predetermined format. In this embodiment, the primary image processing portion 102 converts the image data 60 into a file of PDF offered by Adobe Systems Incorporated. Hereinafter, processing for converting image data into a PDF file is referred to as "primary image processing". A file obtained as a result of the primary image processing is hereinafter referred to as a "primary image file 61".

In the meantime, although the image forming apparatus 1 has a function to convert raw data into a PDF file, the image forming apparatus 1 does not have a function to convert raw data into a Compact PDF file or a JPEG file. Further, the image forming apparatus 1 does not have a function to convert raw data into a format unique to a certain application, e.g., a "Word" format that is word processor software offered by Microsoft Corporation and is hereinafter referred to as a "word processor format".

Accordingly, in the case where a Compact PDF format, a JPEG format, or a word processor format is selected on the save format selection screen SN3 of FIG. 10, it is impossible for the image forming apparatus 1 to convert image data into a file in the selected format. To cope with this, the image processing server 2 is caused to perform such conversion processing instead of the image forming apparatus 1 in accordance with a request from the image forming apparatus 1.

Referring back to the description of FIG. 3, the status information obtaining portion 103 requests the image processing server 2 for status information 71 indicating the current state of the image processing server 2, and obtains the status information 71.

Referring to FIG. 5, when receiving the request from the status information obtaining portion 103 of the image forming apparatus 1, the status information transmission portion 201 of the image processing server 2 checks the current state of the image processing server 2 itself, and sends status information 71 indicating the current state thereof to the image forming apparatus 1. The status information transmission portion 201 sends, to the image forming apparatus 1, the state information 71 indicating specifications such as processing speed of the CPU 20a and a list of unprocessed jobs.

Referring to FIG. 3, the processing time estimating portion 104 estimates, based on the status information 71 obtained by the status information obtaining portion 103, the time required for the image processing server 2 to complete the Scan_To_USB job for which the conditions and the command are received by the processing conditions receiving portion 101. A method for estimating the time is described below. The processing time estimating portion 104, then, determines whether or not the time estimated (the required time) is longer than a predetermined period of time α, e.g., one minute.

First, the processing time estimating portion 104 estimates the time required for the image processing server 2 to execute individual remaining processes that have not yet been executed by the image processing server 2 and are indicated in the list of the status information 71 based on the process details and the specifications of the image processing server 2 indicated in the status information 71. Further, the processing time estimating portion 104 estimates the time required for the image processing server 2 to execute, among steps included in the Scan_To_USB job, remaining steps that have not yet been performed by the image processing server 2 based on the step details and the specifications of the image processing server 2. After that, the processing time estimating portion 104 adds the time estimated for the individual remaining processes and the time estimated for the individual remaining steps together; thereby to calculate the time required for the image processing server 2 to execute the Scan To USB job.

In the case where the time required to execute the Scan_To_USB job is longer than a predetermined period of time α, the receiving time designation receiving portion 105 requests a user to specify a time at which the image file is to be received and receives the time specified by the user in the following manner.

The receiving time designation receiving portion 105, first, displays the receiving time designation screen SN4 shown in FIG. 12.

The user selects, on the receiving time designation screen SN4, one of the following two options. One of the options is to remove the USB flash memory 5 from the image forming apparatus 1 without waiting for the Scan_To_USB job to be completed, go back to his/her desk, connect the USB flash memory 5 to his/her terminal 3, and receive an image file. In short, one of the options is to go back to the user's desk and receive the image file by using his/her terminal 3. The user presses a "Yes" button to select this option. This option is hereinafter referred to as "option A". The other option is to wait for the Scan_To_USB job to be completed and to remove the USB flash memory 5 from the image forming apparatus 1 after the image file is completely saved to the USB flash memory 5. In short, the other option is to receive the image file at the installation site of the image forming apparatus 1. The user presses a "No" button to select this option. This option is hereinafter referred to as "option B".

The receiving time designation receiving portion 105, then, receives the option selected by the user on the receiving time designation screen SN4.

The file storage destination determination portion 106 determines a storage location (storage destination) of a secondary image file 62 when the receiving time designation receiving portion 105 receives the option A. The "secondary image file 62" is an image file generated based on the primary image file 61 by the secondary image processing portion 203 of the image processing server 2. The storage location is a folder provided in the secondary image file database 205 of the image processing server 2. For example, the file storage destination determination portion 106 determines a folder given a folder name including the job ID of the Scan_To_USB job to be the storage location of the secondary image file 62. The secondary image processing portion 203 and the secondary image file database 205 are described in order below.

Then, the file storage destination determination portion 106 changes, as shown in FIG. 11B, a delivery destination device included in the job setting information 70 generated by the processing conditions receiving portion 101 to indicate a "server", and changes a temporary save folder included therein to indicate the storage location determined.

In the case where the option A is selected, the link information writing portion 107 writes, into the USB flash memory 5, as link information 72, the storage location determined by the file storage destination determination portion 106 and a Uniform Resource Locator (URL) indicating a protocol used at the time of downloading the image file, and saves the link information 72 to the USB flash memory 5. For example, if the storage location is "server/db/J00001" and the FTP is used, the URL "FTP://server/db/J00001" is saved as the link information 72.

The primary image file transmission portion 108 sends, to the image processing server 2, the primary image file 61 obtained by the primary image processing portion 102 together with the job setting information 70; thereby to request the image processing server 2 to perform a process on the primary image file 61.

Referring to FIG. 5, the primary image file receiving portion 202 of the image processing server 2 receives the primary image file 61 and the job setting information 70 from the image forming apparatus 1.

The secondary image processing portion 203 converts the primary image file 61 received by the primary image file receiving portion 202 into a file in the format indicated in the job setting information 70 received together with the primary image file 61. In the case where, for example, a word processor format is specified in the job setting information 70, the secondary image processing portion 203 converts the primary image file 61 into a file in the word processor format. Hereinafter, processing for converting the primary image file 61 into a format specified in the job setting information 70 is referred to as "secondary image processing". A file obtained as a result of the secondary image processing is hereinafter referred to as a "secondary image file 62".

Unless the job setting information 70 specifies a "server" as the delivery destination device, e.g., if the job setting information 70 specifies a "USB flash memory" as the delivery destination device, then the secondary image file transmission portion 204 performs the following processes on the secondary image file 62 generated as a result of the secondary image processing. In contrast, if the job setting information 70 specifies a "server" as the delivery destination device, the secondary image file database 205 performs the processes on the secondary image file 62 as described below.

The secondary image file transmission portion 204 sends the secondary image file 62 to the image forming apparatus 1, unless the job setting information 70 specifies a "server" as the delivery destination device.

The secondary image file database 205 is a file managing system, and contains a folder, therein, for each Scan_To_USB job of which the delivery destination device is a "server". The generated secondary image file 62 is saved to a temporary save folder indicated in the job setting information 70. However, if such a temporary save folder is not present, then the secondary image file database 205 generates such a temporary save folder, and saves the secondary image file 62 thereto.

Referring to FIG. 3, the secondary image file receiving portion 121 of the image forming apparatus 1 receives the secondary image file 62 from the image processing server 2.

The secondary image file writing portion 122 writes the received secondary image file 62 into the folder that is contained in the USB flash memory 5 and received by the processing conditions receiving portion 101, i.e., the folder selected on the destination folder selection screen SN2 of FIG. 9.

After the secondary image file 62 or the link information 72 is saved to the USB flash memory 5, a message indicating that the user may remove the USB flash memory 5 from the image forming apparatus 1 is displayed on the touchscreen 10h.

The user removes the USB flash memory 5 from the image forming apparatus 1 and goes back to his/her desk. If the secondary image file 62 is stored in the USB flash memory 5, then the user connects the USB flash memory 5 to his/her terminal 3 to use the secondary image file 62. On the other hand, if the link information 72 rather than the secondary image file 62 is stored therein, then the user obtains the secondary image file 62 from the image processing server 2 in the following manner.

Referring to FIG. 7, the link information obtaining portion 301 reads out the link information 72 from the USB flash memory 5 connected to the subject terminal 3, and obtains the link information 72.

The secondary image file obtaining portion 302 accesses the image processing server 2 based on the link information 72 obtained. The secondary image file obtaining portion 302, then, requests the image processing server 2 for the secondary image file 62 saved in the temporary save folder specified in the link information 72.

In response to the request, the secondary image file providing portion 206 of the image processing server 2 provides the terminal 3 with the secondary image file 62 requested. In this way, the secondary image file 62 is downloaded to the terminal 3, so that the user can use the secondary image file 62 by using his/her terminal 3. If the secondary image file 62 has not yet been saved in the temporary save folder, then the user reattempts to download the same at a predetermined time, e.g., at predetermined time intervals.

After the secondary image file obtaining portion 302 finishes downloading the secondary image file 62, the link information erasing portion 303 erases the link information 72 from the USB flash memory 5. Note that the secondary image file 62 that has been downloaded to the terminal 3 may be erased from the secondary image file database 205 of the image processing server 2.

Figure 13:
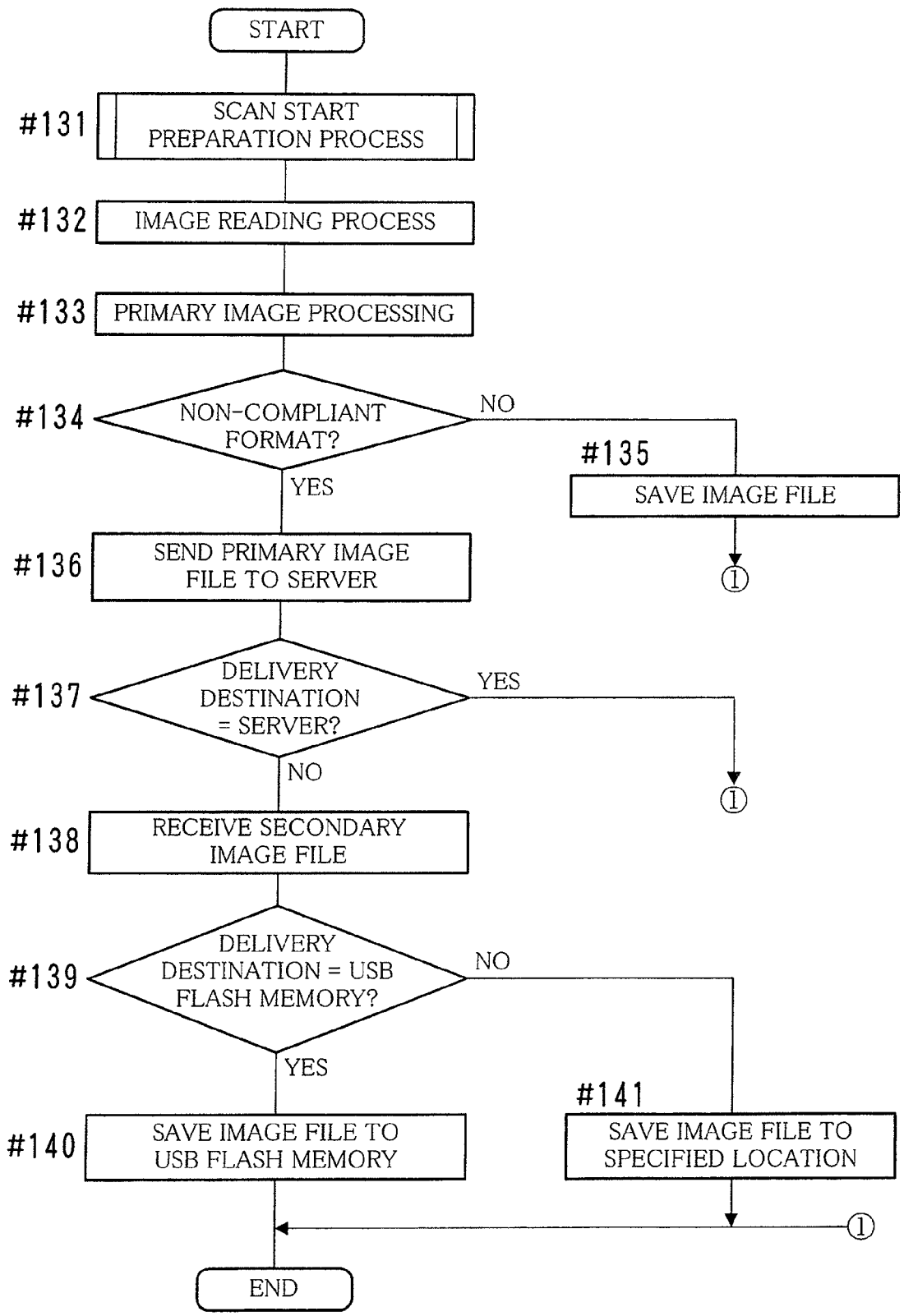
FIG. 13 is a flowchart depicting an example of the overall processing flow of an image forming apparatus.
Figure 14:
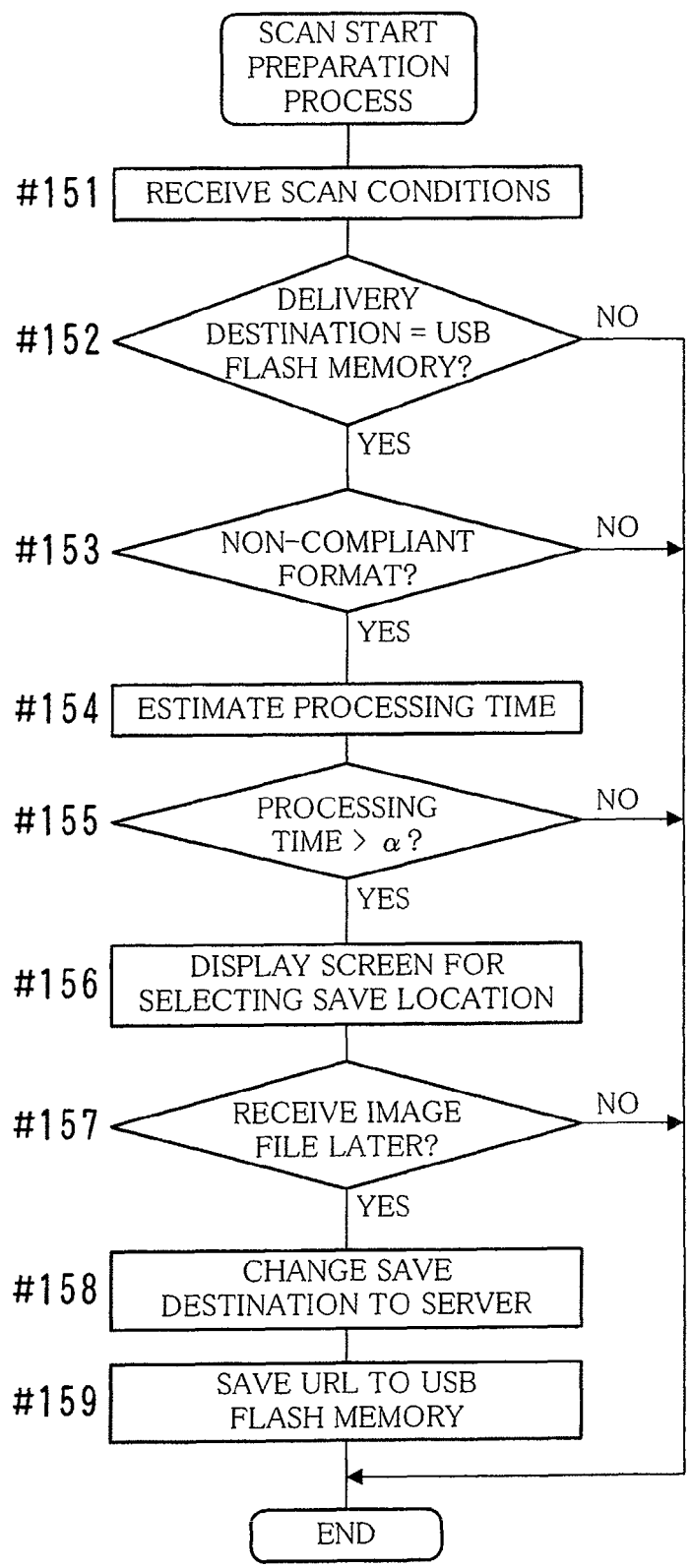
FIG. 14 is a flowchart depicting an example of the flow of a scan start preparation process.

FIG. 13 is a flowchart depicting an example of the overall processing flow of the image forming apparatus 1; FIG. 14 is a flowchart depicting an example of the flow of a scan start preparation process; and FIG. 15 is a flowchart depicting an example of the overall processing flow of the image processing server 2.

Figure 15:
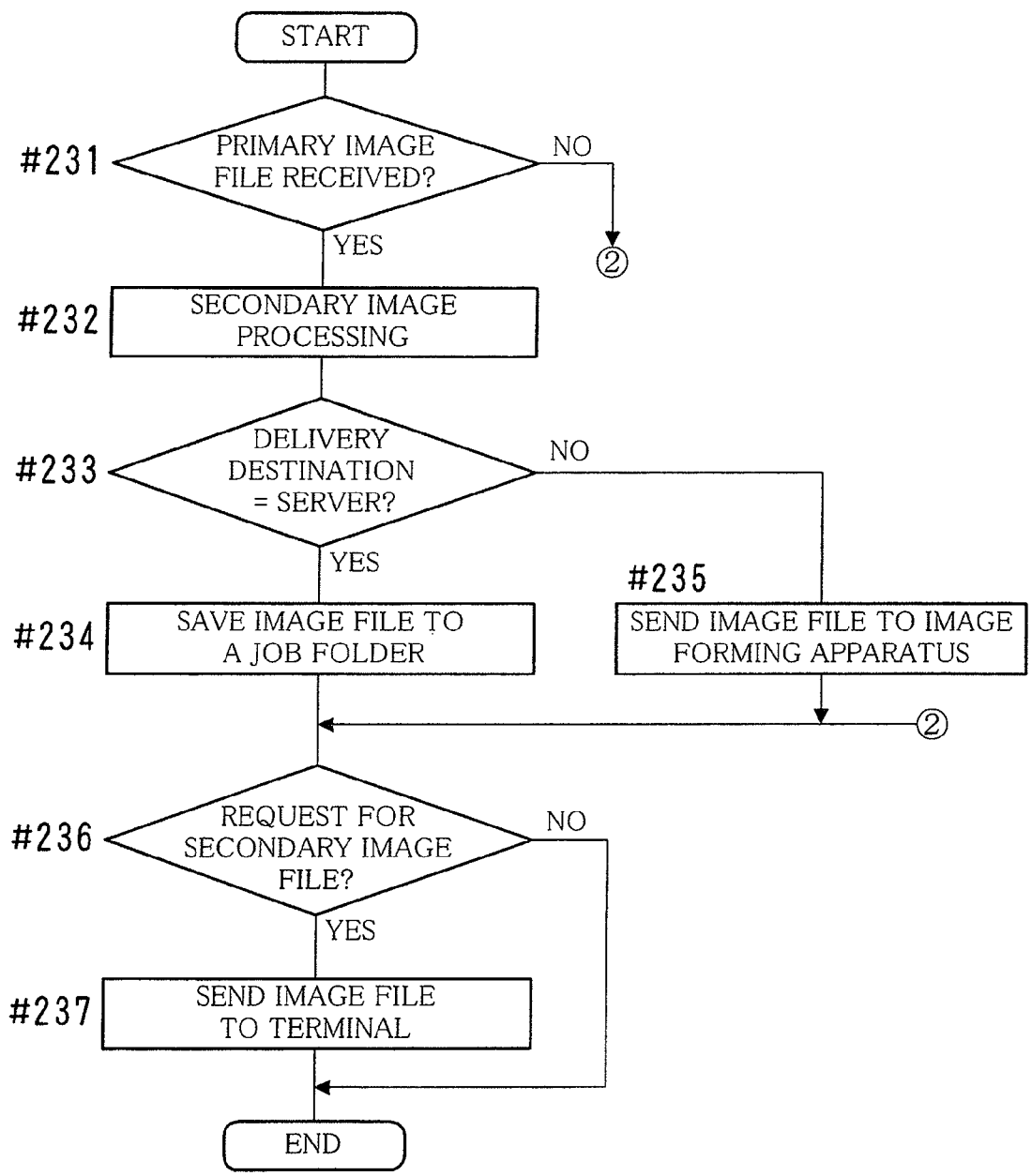
FIG. 15 is a flowchart depicting an example of the overall processing flow of an image processing server.

The following is a description of the overall process steps for executing a Scan_To_USB job performed by the image forming apparatus 1 and the image processing server 2 with reference to the flowcharts of FIGS. 13, 14, and 15. The CPU 10a of the image forming apparatus 1 executes the processes shown in FIGS. 13 and 14, and the CPU 20a of the image processing server 2 executes the processes shown in FIG. 15.

When a predetermined command is entered, the image forming apparatus 1 performs a preparation process for a Scan_To_USB job (#131 of FIG. 13). The preparation process is performed in the manner as shown in FIG. 14.

A USB flash memory 5 is connected to the image forming apparatus 1, and paper carrying an image to be scanned is placed therein. The image forming apparatus 1 displays, in order, the delivery destination selection screen SN1, the destination folder selection screen SN2, and the save format selection screen SN3 (see FIGS. 8-10, respectively) depending on operation performed by a user, and receives conditions for executing the Scan_To_USB job (#151 of FIG. 14).

If a "USB flash memory" is specified as the delivery destination device (Yes in #152), and a format into which the image forming apparatus 1 cannot convert an image file is specified as the format (Yes in #153), then the image forming apparatus 1 estimates the necessary time for the image processing server 2 to complete conversion processing into the specified format, i.e., secondary image processing (#154).

If the necessary time is longer than a predetermined period of time α (Yes in #155), then the image forming apparatus 1 displays the receiving time designation screen SN4 (see FIG. 12); thereby to prompt the user to select a time at which the image file is to be received (#156).

If the user selects an option (option A) in which the user goes back to his/her desk and receives the image file by using his/her terminal 3 (Yes in #157), then the image forming apparatus 1 changes the delivery destination device to indicate a "server", and changes the temporary save folder to indicate a folder for the Scan_To_USB job provided in the image processing server 2 (#158). The image forming apparatus 1 also writes, into the USB flash memory 5, as the link information 72, an address of the folder on the network, and a URL indicating a protocol used to obtain the image file (#159).

Referring back to FIG. 13, when receiving the conditions for the Scan_To_USB job specified by the user and the like, the image forming apparatus 1 scans the image depicted on the paper to create image data 60, which is raw data (#132), performs the primary image processing on the image data 60, and generates a primary image file 61 (#133).

If the image forming apparatus 1 is capable of converting the primary image file 61 into the file format specified by the user (No in #134), then the image forming apparatus 1 appropriately converts the primary image file 61 into the file format specified by the user, and writes the resultant file into the USB flash memory 5 (#135).

In contrast, if the image forming apparatus 1 is incapable of converting the primary image file 61 into the file format specified by the user (Yes in #134), then the image forming apparatus 1 sends the primary image file 61 to the image processing server 2 together with the job setting information 70 (#136). If the user selects the option A on the receiving time designation screen SN4, then the job setting information 70 indicates, as shown in FIG. 11A, the image processing server 2 and a folder provided therein respectively as the delivery destination device and the temporary save folder. If the user selects the option B, then the job setting information 70 indicates, as shown in FIG. 11B, a USB flash memory and a folder provided in the image forming apparatus 1 as the delivery destination device and the temporary save folder.

If a server is not specified as the delivery destination device indicated in the job setting information 70 (No in #137), then a secondary image file 62 is transmitted from the image processing server 2 after a period of time when the image forming apparatus 1 sent the primary image file 61. The image forming apparatus 1 receives the secondary image file 62 (#138). If a USB flash memory is specified as the delivery destination device (Yes in #139), then the image forming apparatus 1 writes the secondary image file 62 into a delivery destination folder provided in the USB flash memory 5 connected to the image forming apparatus 1 (#140). On the other hand, if a device other than a USB flash memory is specified as the delivery destination device (No in #139), then the image forming apparatus 1 saves the secondary image file 62 to the specified device (#141).

Every time an event occurs, the image processing server 2 performs a process according to the event in the following manner.

When receiving a primary image file 61 and job setting information 70 from the image forming apparatus 1 (Yes in #231 of FIG. 15), the image processing server 2 performs, on the primary image file 61, secondary image processing that is conversion processing for converting the primary image file 61 into a format specified in the job setting information 70, and generates a secondary image file 62 (#232). If a server is specified as the delivery destination device indicated in the job setting information 70 (Yes in #233), then the image processing server 2 saves the secondary image file 62 to a temporary save folder that is specified in the job setting information 70 and provided in the image processing server 2 (#234). If a device other than a server is specified as the delivery destination device (No in #233), then the image processing server 2 sends the secondary image file 62 to the image forming apparatus 1 (#235).

If the image processing server 2 receives, from the terminal 3, a request for a secondary image file 62 saved in the temporary save folder (Yes in #236), then the image processing server 2 sends the secondary image file 62 to the terminal 3 (#237).

This embodiment enables a user to store a secondary image file 62 into a USB flash memory 5 without waiting for the image forming apparatus 1 to finish image processing even if it takes time for the image forming apparatus 1 to perform the image processing. Thus, the user can use the USB flash memory 5 in the image forming apparatus more convenient as compared with conventional technologies.

This embodiment describes an example in which the primary image processing and the secondary image processing are image processing for format conversion. The present embodiment, however, is applicable to image processing other than those described. The embodiment is applicable, for example, to a case where the secondary image processing is processing for compressing data into a ZIP format. In such a case, the following configuration is possible. To be specific, if the number of compression processes of data whose format is to be compressed into a ZIP format but has not yet been compressed by the image processing server 2, i.e., the number of such files and the number of such documents, is equal to or greater than a predetermined number, e.g., 10, the processing time estimating portion 104 may determine that the time required for the image processing server 2 to finish a new Scan_To_USB job is longer than a predetermined period of time α.

There is a process that obviously requires a predetermined period of time or longer until the process is completed, even if the processing time estimating portion 104 does not estimate the necessary time for the process to be completed. In view of this, another configuration is possible in which, if secondary image processing included in a Scan_To_USB job is predetermined processing, a user is requested to select a time at which a secondary image file 62 is to be received irrespective of the estimation result by the processing time estimating portion 104.

Suppose that, for example, neither the image forming apparatus 1 nor the image processing server 2 has a board for compressing data into JPEG format, and the image processing server 2 uses software to compress data into JPEG data. In such a case, if a command to execute a Scan_To_USB job including a step of compressing data into JPEG format is given by a user, the image forming apparatus 1 may request the user to specify a time at which a secondary image file 62 is to be received.

Alternatively, suppose that, for example, the image processing server 2 uses software to compress data based on Block Truncation Coding (BTC), and further, to compress the resultant data based on Joint Bi-level Image experts Group (JBIG). In such a case, if a command to execute a Scan_To_USB job including a step of compressing an image file of a color image based on the BTC and the JBIG is given by a user, then the image forming apparatus 1 may request the user to specify a time at which a secondary image file 62 is to be received.

In this embodiment, the secondary image file database 205 of the image processing server 2 is provided with one folder for each Scan_To_USB job. This makes it possible to specify (identify) one file even if link information 72 does not include a file name. In the case where one folder is commonly used for a plurality of Scan_To_USB jobs, the file name of a secondary image file 62 is preferably included in an URL. The file storage destination determination portion 106 of the image forming apparatus 1 may determine the file name, or, alternatively, the image processing server 2 may determine the file name and inform the image forming apparatus 1 of the file name.

This embodiment describes an example in which link information 72 or a secondary image file 62 is stored in a USB flash memory 5. This embodiment is also applicable to a case where the link information 72 or the secondary image file 62 is stored in another portable storage medium. For example, this embodiment is also applicable to a case of using various types/formats of portable storage media such as a CD-R, SD card, an IC card, and a portable hard disk. In the case of using a mobile phone terminal, the image forming apparatus 1 may perform communication with the mobile phone terminal based on, as the interface, Bluetooth instead of the USB.

In this embodiment, scanned image data is a processing target. Instead, however, this embodiment is applicable to a case where an image file saved in a box is a processing target.

In this embodiment, in the case where it is determined that it takes a predetermined amount of time or more to perform secondary image processing, a user is prompted to select whether or not to temporarily store, into a USB flash memory 5, the link information 72 rather than the secondary image file 62. It is possible to prompt the user to make such selection also when it takes a predetermined amount of time or more to perform primary image processing.

Alternatively, in the case where it is determined that it takes a predetermined amount of time or more to perform secondary image processing, it is possible to temporarily store the link information 72 rather than the secondary image file 62 into the USB flash memory 5 forcibly without prompting the user to make the selection.

According to this embodiment, the image processing server 2 sends the secondary image file 62 to the terminal 3. Instead, however, the image processing server 2 may send the secondary image file 62 to the image forming apparatus 1, and the image forming apparatus 1 may send the secondary image file 62 to the terminal 3. Further, the FTP is used as a protocol for performing communication with the secondary image file 62 in this embodiment. Instead, however, Hypertext Transfer Protocol (HTTP) may be used as the protocol for communication with the secondary image file 62.

Figure 16:
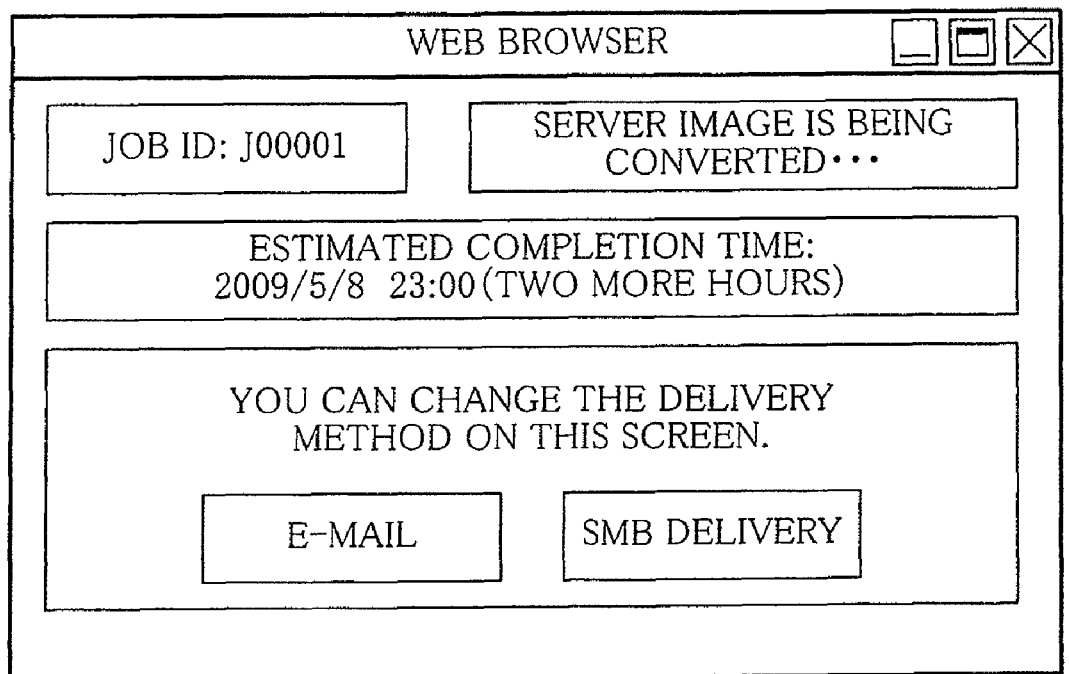
FIG. 16 is a diagram illustrating an example of a delivery method changing screen.
Figure 17:
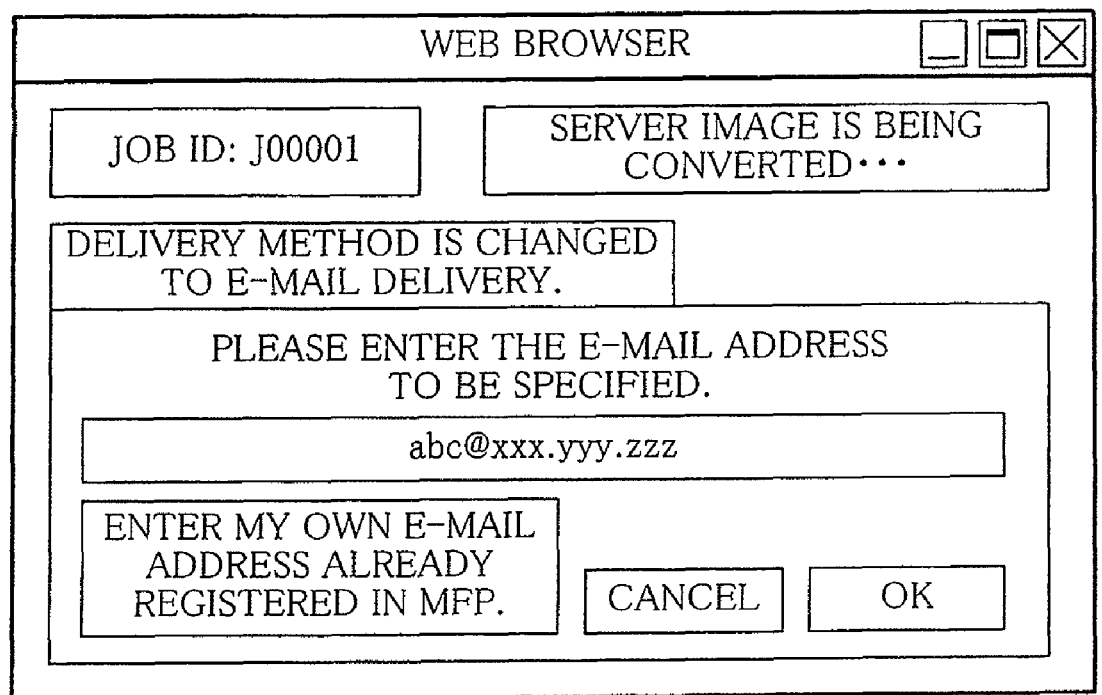
FIG. 17 is a diagram illustrating an example of an electronic mail address designation screen.
Figure 18:
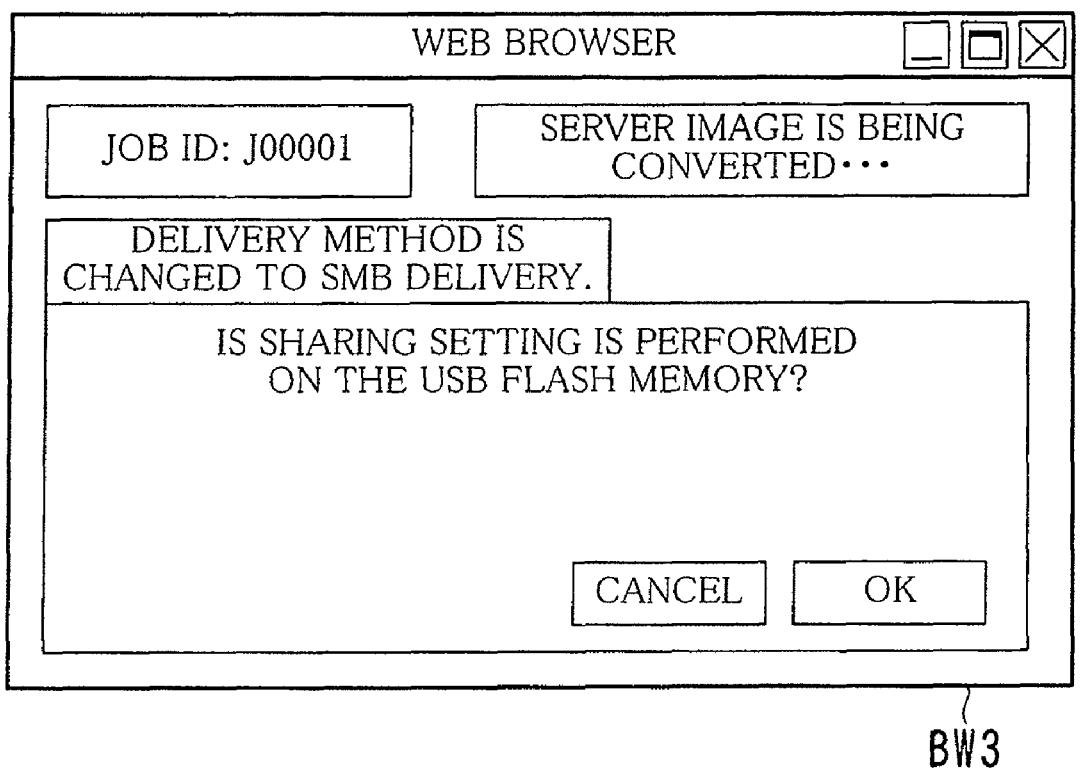
FIG. 18 is a diagram illustrating an example of a sharing setting screen.

FIG. 16 is a diagram illustrating an example of a delivery method changing screen BW1; FIG. 17 is a diagram illustrating an example of an electronic mail address designation screen BW2; and FIG. 18 is a diagram illustrating an example of a sharing setting screen BW3.

It is sometimes a case where, even if a user goes back to his/her desk, connects a USB flash memory 5 to his/her terminal 3, and attempt to download a secondary image file 62 based on link information 72, the secondary image file 62 has not yet been generated in the image processing server 2. In order to improve the user-friendliness for such a case, the network system NS may be configured as follows.

In the case where the secondary image file 62 corresponding to the link information 72 cannot be obtained from the image processing server 2, the terminal 3 displays the delivery method changing screen BW1 shown in FIG. 16. The user makes settings on the delivery method changing screen BW1 in such a manner to obtain the secondary image file 62 via electronic mail (E-mail) or SMB instead of the FTP. The delivery method changing screen BW1 includes a field indicating a date and time at which creation of the secondary image file 62 is probably completed, i.e., an expected completion time. This expected completion time is preferably calculated by the image processing server 2 or the terminal 3 based on the details of jobs accumulated in the image processing server 2 and the specifications of the image processing server 2. Another configuration is possible in which the delivery method changing screen BW1 includes the progress of the entire image processing server 2 until the secondary image file 62 is generated, e.g., not only the expected completion time but also the processing states of other jobs.

The user presses an "E-mail" button to obtain the secondary image file 62 via electronic mail. In response to the "E-mail" button pressed, the terminal 3 displays the electronic mail address designation screen BW2 shown in FIG. 17. The user, then, specifies an electronic mail address of the delivery destination of the secondary image file 62 on the electronic mail address specifying screen BW2.

Responding to this operation, the terminal 3 informs the image processing server 2 of the electronic mail address specified by the user. When the secondary image file 62 is generated, the secondary image file providing portion 206 of the image processing server 2 transmits an electronic mail message to which the secondary image file 62 is attached to the electronic mail address informed by the terminal 3.

Alternatively, the user presses an "SMB delivery" button to obtain the secondary image file 62 over SMB. In response to the "SMB delivery" button pressed, the terminal 3 displays the sharing setting screen BW3 shown in FIG. 18. In order to write a file into the USB flash memory 5 over SMB, it is necessary to use the USB flash memory 5 commonly in the network. If the user determines that the USB flash memory 5 may be used commonly on the network, then he/she presses an "OK" button. Responding to this operation, the terminal 3 makes settings in such a manner that the USB flash memory 5 is used commonly.

When the secondary image file 62 is generated, the secondary image file providing portion 206 of the image processing server 2 accesses the terminal 3 and writes the secondary image file 62 into the USB flash memory 5 connected to the terminal 3 over SMB. After the secondary image file 62 is written into the USB flash memory 5, the terminal 3 releases the settings for the common use.

In the embodiments discussed above, the overall configurations of the network system NS, the image forming apparatus 1, the image processing server 2, and the terminal 3, the configurations of various portions thereof, the content to be processed, the processing order, the configuration of the database, the structure of the table, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A system for handling image data, the system comprising:
    an image processing system that performs a specific process on image data; and
    a terminal,
wherein
    the image processing system includes
        a specific process portion that performs a specific process on first image data to generate second image data,
        an estimating portion that, if it is specified that the second image data is to be stored into a portable storage medium, estimates a necessary time that is a time required for the second image data to be generated,
        a selection portion for a user to determine whether or not to store, instead of the second image data, identification information for obtaining the second image data into the portable storage medium, if the necessary time thus estimated is longer than a predetermined period of time,
        an image data storage control portion that, if the user determines not to store the identification information into the portable storage medium, stores the second image data into the portable storage medium after the second image data is completely generated, and
        an identification information storage control portion that, if the user determines to store the identification information into the portable storage medium, stores, as the identification information, information including a storage location of the second image data into the portable storage medium, and stores the second image data into an image data storage portion after the second image data is completely generated,
    the terminal includes
        a reading portion that reads out the identification information from the portable storage medium, and
        a request portion that makes a request to the image processing system, via a communication line, for the second image data based on the identification information thus read out, and
    the image processing system further includes a transmission portion that transmits, to the terminal, the second image data stored in the image data storage portion in accordance with the request from the terminal.

2. The system according to claim 1, wherein
    the image processing system includes an image forming apparatus and an image processing server, and
    the specific process portion is provided in the image processing server, and performs the specific process on the first image data sent from the image forming apparatus.

3. The system according to claim 1, wherein the image processing system comprises an image forming apparatus.

4. The system according to claim 1, wherein, if the second image data has not yet been generated upon receiving the request for the second image data, then the transmission portion transmits the second image data by using a method specified by the user after the second image data is completely generated.

5. An image processing system, comprising:
    a specific process portion that performs a specific process on first image data to generate second image data;
    an estimating portion that, if it is specified that the second image data is to be stored into a portable storage medium, estimates a necessary time that is a time required for the second image data to be generated;
    a selection portion for a user to determine whether or not to store, instead of the second image data, identification information for obtaining the second image data into the portable storage medium, if the necessary time thus estimated is longer than a predetermined period of time;
    an image data storage control portion that, if the user determines not to store the identification information into the portable storage medium, stores the second image data into the portable storage medium after the second image data is completely generated;
    an identification information storage control portion that, if the user determines to store the identification information into the portable storage medium, stores, as the identification information, information including a storage location of the second image data into the portable storage medium, and stores the second image data into an image data storage portion after the second image data is completely generated; and
    a transmission portion that transmits, to a terminal, the second image data stored in the image data storage portion in accordance with a request from the terminal.

6. The image processing system according to claim 5, wherein
    the image processing system includes an image forming apparatus and an image processing server, and
    the specific process portion is provided in the image processing server, and performs the specific process on the first image data sent from the image forming apparatus.

7. The image processing system according to claim 5, wherein the image processing system comprises an image forming apparatus.

8. The image processing system according to claim 5, wherein, if the second image data has not yet been generated upon receiving the request for the second image data, then the transmission portion transmits the second image data by using a method specified by the user after the second image data is completely generated.

9. An image processing apparatus, comprising:
    an image data obtaining portion that obtains first image data;
    a specific image process requesting portion that requests another processing apparatus to generate second image data by performing a specific process on the first image data thus obtained;
    an estimating portion that, if it is specified that the second image data is to be stored into a portable storage medium, estimates a necessary time that is a time required for the second image data to be generated;
    a selection portion for a user to determine whether or not to store, instead of the second image data, identification information for obtaining the second image data into the portable storage medium, if the necessary time thus estimated is longer than a predetermined period of time;
    an image data receiving portion that receives the second image data from said another processing apparatus;
    an image data storage control portion that, if the user determines not to store the identification information into the portable storage medium, stores the second image data into the portable storage medium after the second image data transmitted from said another processing apparatus is received; and an identification information storage control portion that, if the user determines to store the identification information into the portable storage medium, stores, as the identification information, information including a storage location of the second image data into the portable storage medium, and stores the second image data into an image data storage portion after the second image data is received.

10. A method for providing a user with second image data by using a portable storage medium, the second image data being generated by performing a specific process on first image data, the method comprising:

causing an image processing system to perform, if it is specified that the second image data is to be stored into the portable storage medium, a process of estimating a necessary time that is a time required for the second image data to be generated;

causing the image processing system to perform, if the necessary time thus estimated is longer than a predetermined period of time, a process of prompting the user to determine whether or not to store, instead of the second image data, identification information for obtaining the second image data into the portable storage medium;

causing the image processing system to perform a process of generating the second image data;

causing the image processing system to perform, if the user determines not to store the identification information into the portable storage medium, a process of storing the second image data into the portable storage medium after the second image data is completely generated;

causing the image processing system to perform, if the user determines to store the identification information into the portable storage medium, a process of storing, as the identification information, information including a storage location of the second image data into the portable storage medium, and storing the second image data into an image data storage portion after the second image data is completely generated;

causing a terminal to perform a process of reading out the identification information from the portable storage medium;

causing the terminal to perform a process of making a request to the image processing system, via a communication line, for the second image data based on the identification information thus read out; and causing the image processing system to further perform a process of transmitting, to the terminal, the second image data stored in the image data storage portion in accordance with the request from the terminal.

11. The method according to claim 10, wherein
the image processing system includes an image forming apparatus and an image processing server, and
the image processing server performs the specific process on the first image data sent from the image forming apparatus.

12. The method according to claim 10, wherein the image processing system comprises an image forming apparatus.

13. The method according to claim 10, wherein, if the second image data has not yet been generated upon receiving the request for the second image data, then the image processing system is caused to perform a process of transmitting the second image data by using a method specified by the user after the second image data is completely generated.

14. A non-transitory computer-readable storage medium storing thereon a computer program used in an image processing apparatus for handling image data, the computer program causing the image processing apparatus to perform:

a process for obtaining first image data;

a process for requesting another processing apparatus to generate second image data by performing a specific process on the first image data thus obtained;

a process for estimating, if it is specified that the second image data is to be stored into a portable storage medium, a necessary time that is a time required for the second image data to be generated;

a process for prompting, if the necessary time thus estimated is longer than a predetermined period of time, a user to determine whether or not to store, instead of the second image data, identification information for obtaining the second image data into the portable storage medium;

a first storage control process for storing, if the user determines not to store the identification information into the portable storage medium, the second image data into the portable storage medium after the second image data transmitted from said another processing apparatus is received; and a second storage control process for storing, if the user determines to store the identification information into the portable storage medium, as the identification information, information including a storage location of the second image data into the portable storage medium, and storing the second image data into an image data storage portion after the second image data is received.

* * * * *